United States Patent
Jin et al.

(10) Patent No.: US 9,392,309 B2
(45) Date of Patent: Jul. 12, 2016

(54) ENTITLEMENT MANAGEMENT FOR VIDEO CUSTOMERS

(71) Applicant: Verizon Patent and Licensing Inc., Basking Ridge, NJ (US)

(72) Inventors: Zhiying Jin, Lexington, MA (US); Ruishuang Wang, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 189 days.

(21) Appl. No.: 13/887,896

(22) Filed: May 6, 2013

(65) Prior Publication Data
US 2014/0331252 A1    Nov. 6, 2014

(51) Int. Cl.
  *H04N 7/16* (2011.01)
  *H04N 21/254* (2011.01)
  *H04N 21/2543* (2011.01)
  *H04N 21/658* (2011.01)
  *H04N 21/8352* (2011.01)
  *H04N 21/8355* (2011.01)

(52) U.S. Cl.
  CPC ....... *H04N 21/2541* (2013.01); *H04N 21/2543* (2013.01); *H04N 21/6581* (2013.01); *H04N 21/8352* (2013.01); *H04N 21/8355* (2013.01)

(58) Field of Classification Search
  CPC .................... H04N 21/26606; H04N 21/4623
  See application file for complete search history.

(56) References Cited

U.S. PATENT DOCUMENTS

| | | | |
|---|---|---|---|
| 2004/0068541 A1* | 4/2004 | Bayassi et al. | 709/204 |
| 2008/0168508 A1* | 7/2008 | Hamada et al. | 725/91 |
| 2009/0177585 A1* | 7/2009 | Eskicioglu et al. | 705/67 |
| 2011/0188655 A1* | 8/2011 | Moreillon et al. | 380/255 |
| 2013/0006769 A1* | 1/2013 | Schalk et al. | 705/14.54 |
| 2013/0007797 A1* | 1/2013 | Ooi | 725/29 |
| 2013/0332260 A1* | 12/2013 | Cheng et al. | 705/14.42 |
| 2014/0177835 A1* | 6/2014 | Fischer | 380/210 |

* cited by examiner

*Primary Examiner* — Junior Mendoza

(57) ABSTRACT

A method includes receiving, at a server device, a request to generate an entitlement identifier (ID) associated with a customer transaction. The method also includes determining a customer ID, a video content ID, and a time window associated with the customer transaction. The method includes determining, by the server device, the entitlement ID based on the customer ID, video content ID, and the time window. The method also includes providing the entitlement ID to a user device associated with the customer. The user device is configurable to receive access to video content based on the entitlement ID.

19 Claims, 9 Drawing Sheets

FIG. 5A

ENTITLEMENT ID 502a
- VIDEO CONTENT ID 510a
- CUSTOMER ID 520a
- TIME WINDOW 530a

ENTITLEMENT ID 502b
- VIDEO CONTENT ID 510b
- CUSTOMER ID 520b
- TIME WINDOW 530b

ENTITLEMENT RIGHTS 550
- MONTHLY SUBSCRIPTION 555
- PURCHASED 560
- RENTED 565
- DOWNLOAD PERMITTED 570
- STREAMING PERMITTED 575
- ASSET QUALITY 580

550

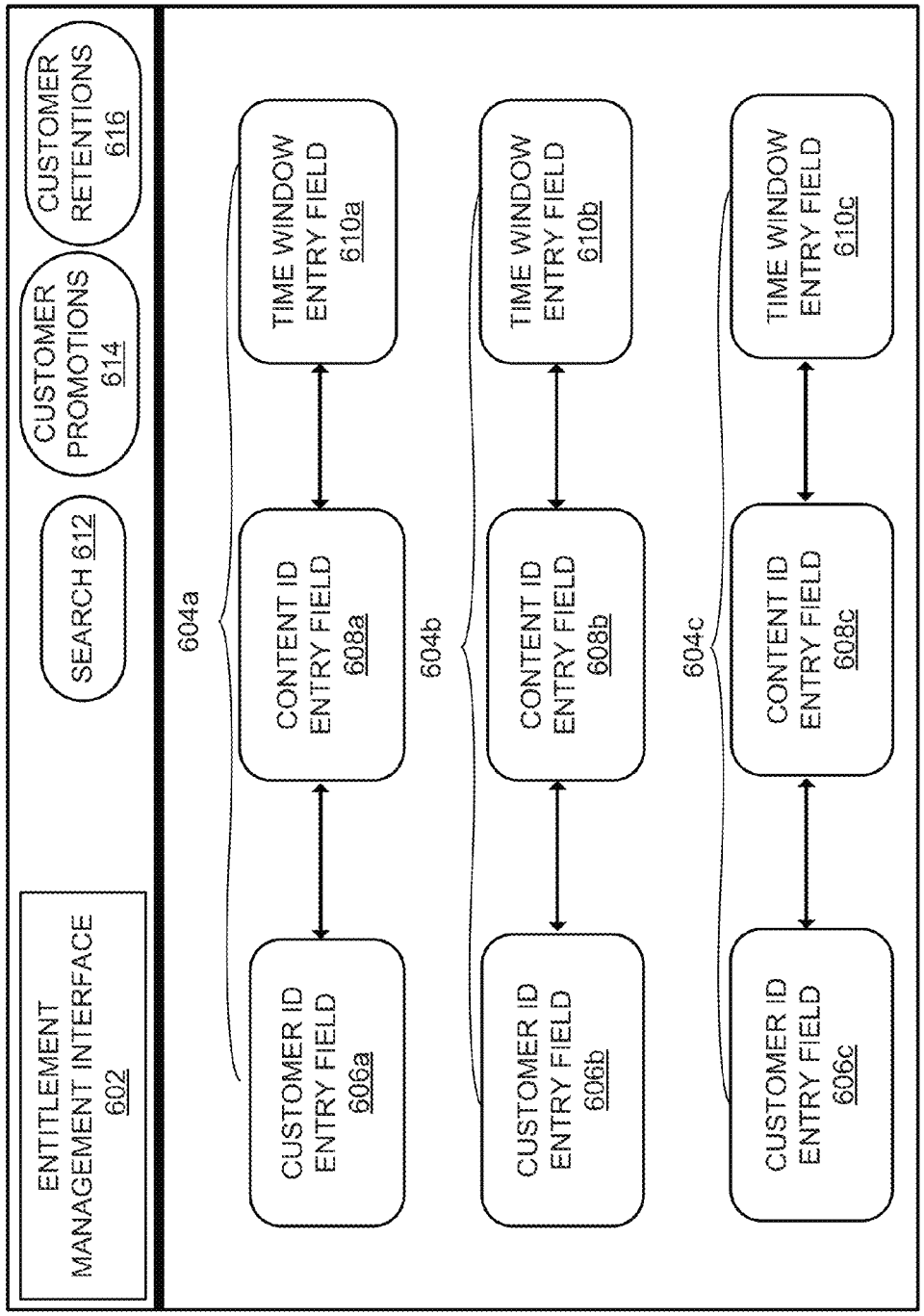

ENTITLEMENT MANAGEMENT FOR VIDEO CUSTOMERS

BACKGROUND

Video service providers currently provide multiple services and programs, including cable television, network television, and video on demand, to their customers. In some instances, individual customers may receive combinations of these multiple services from a single video service provider.

Video content may be hosted and provided by a video content provider to devices associated with customers of the video content provider. Customers may complete a transaction such as a subscription, purchase, or rental and receive an entitlement to access to particular video content from the video content provider. The video content provider may manage a relationship with the customer based on the entitlements.

BRIEF DESCRIPTION OF THE DRAWINGS

FIGS. 5A and 5B, respectively, are diagrams of an exemplary entitlement ID and an exemplary entitlement rights master card;

FIG. 6 is an exemplary user interface for an entitlement management user interface;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide entitlement management for digital video content. Entitlements may be determined and managed based on a customer ID, a time window and a video content ID. The video content entitlements may be provided in association with a system that includes digital video content and physical video content. The entitlements may be determined based on purchase, rental, or subscription.

Consistent with embodiments, entitlements may be updated and/or removed based on the customer ID, the time window and the video content ID. Entitlements may be applied to different categories of video content and/or groups of customers. Entitlements may be generated on a contingent basis for different types of video content.

Figure 1:
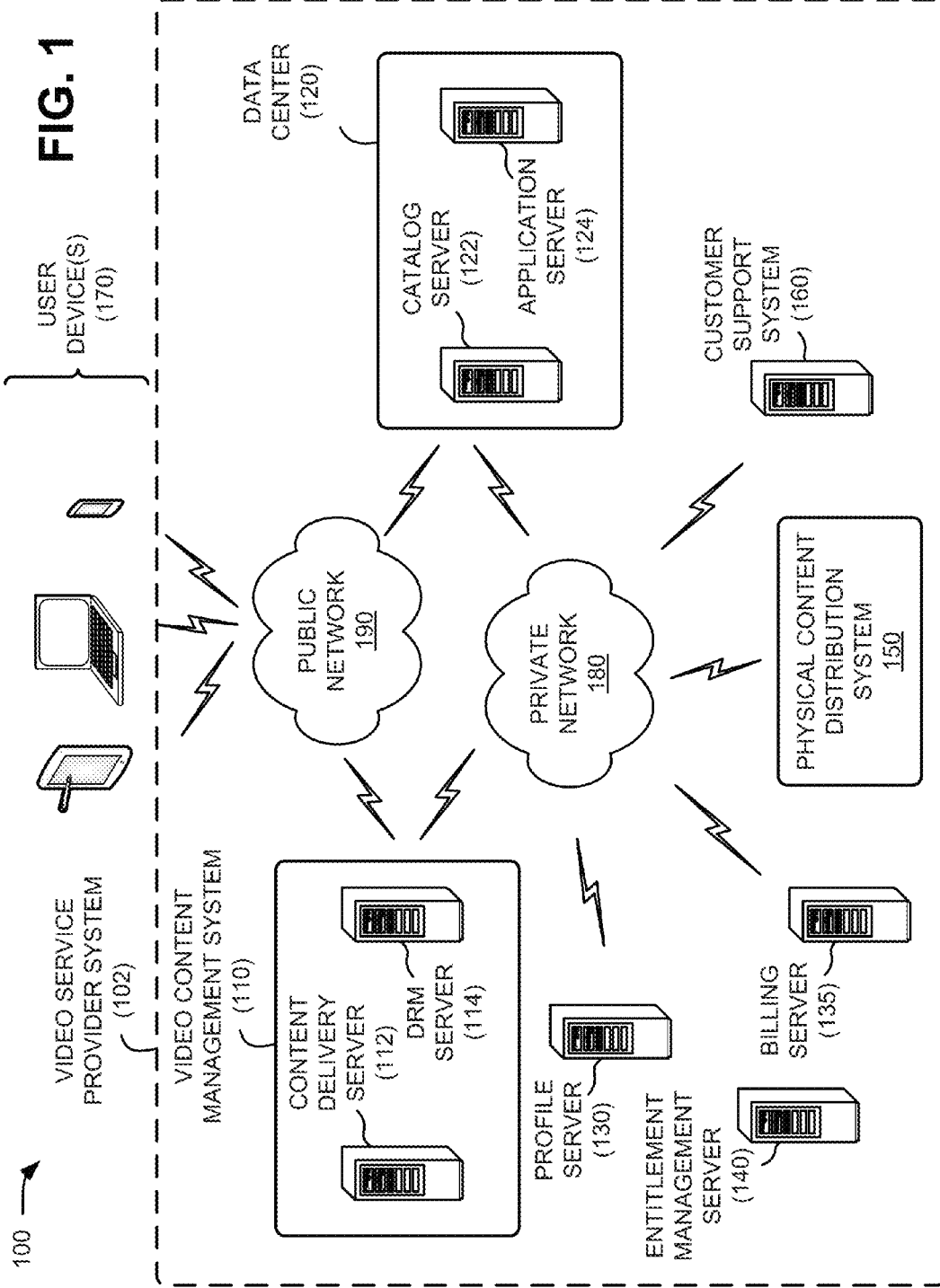
FIG. 1 is an exemplary network in which systems and/or methods described herein may be implemented.

FIG. 1 is an exemplary network 100 in which systems and/or methods described herein may be implemented. As illustrated, network 100 may include a video service provider system 102 and user devices 170, which may receive an online video service from video service provider system 102. Video service provider system 102 may include video content management system (VCMS) 110, a data center 120, a profile server 130, a billing server 135, an entitlement management server 140, a physical content distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 135, entitlement management servers 140, physical content distribution systems 150, customer support systems 160, user devices 170, and/or networks 180/190. Components of network 100 may be connected via wired and/or wireless links.

User devices 170 may enable a user to receive video content (i.e., an online video session) from video service provider system 102. User devices 170 may include, for example, set top box, a gaming console, a personal communications system (PCS) terminal (e.g., a smartphone that may combine a cellular radiotelephone with data processing and data communications capabilities), a tablet computer, a personal computer, a laptop computer, an Internet television, or other types of computation or communication devices.

Video service provider system 102 may be part of a core network that provides online video service. Video service provider system 102 may be affiliated with a service provider entity (e.g., a commercial video service provider). Video service provider system 102 may provide multiscreen support for the online video service (e.g., for Internet protocol (IP) based video content) to user devices 170 in association with a partner entity (i.e., a digital service reseller that acts as a partner of the video service provider entity).

VCMS 110 may aggregate content, process content, and distribute content. In one implementation, VCMS 110 may include a content delivery server 112 and a digital rights management (DRM) server 114. VCMS 110 may aggregate content and transcode content into a digital format suitable for consumption on particular user devices 170. For example, VCMS 110 may include a transcoding device to convert an audio, video, multimedia or graphic file from one format to another (e.g., from one bit rate to another bit rate, from one resolution to another, from one standard to another, from one file size to another, etc.). VCMS 110 may also encrypt data and communicate with user devices 170 through DRM server 114 to enforce digital rights.

Content delivery server 112 may deliver digital content from a backend server to user devices 170. In one implementation, content delivery server 112 may include a streaming server that provides streaming data packets (e.g., via a streaming uniform resource locator (URL)) to user devices 170 (e.g., via public network 190). In one implementation, a streaming URL may be session-based, such that each URL can be used only once for one user device 170 for security purposes.

DRM server 114 may issue, validate, and/or enforce DRM licenses to a mobile client, such as an application running on one of user devices 170. In implementations described herein, DRM server 114 may communicate with user device 170 to validate an authorization token in issuing a license for an application residing on user device 170.

Data center 120 may manage the authorization, selection, and/or purchase of multimedia content by a user of user device 170 (i.e., based on input associated with the user received from user device 170). As shown in FIG. 1, data center 120 may include a catalog server 122 and an application server 124. In one implementation, user devices 170 may access data center 120 via public network 190.

Catalog server 122 may provide a catalog of content for users (e.g., of user devices 170) to order/consume (e.g., buy, rent, or subscribe). In one implementation, catalog server 122 may collect and/or present listings of content available to user devices 170. For example, catalog server 122 may receive digital content metadata, such as lists or categories of content, from VCMS 110. Catalog server 122 may use the content metadata to provide currently available content options to user devices 170. Catalog server 122 may provide the content metadata to user device 170 directly or may communicate with user device 170 via application server 124.

According to one implementation, catalog server 122 may provide content listings based on entitlements associated with particular customers, for example, as described below with respect to FIG. 3.

Application server 124 may provide a backend support system for applications residing on user devices 170. For example, application server 124 may permit user device 170 to download an application that enables a user to find content of interest or play downloaded or streaming content. Application server 124 may provide digital content in association with VCMS 110. In one implementation, the interactions between application server 124 and user device 170 may be performed using hypertext transfer protocol (HTTP) or secure HTTP (HTTPS) via public network 190. In one implementation, all HTTP transport may be over secure sockets layer (SSL) or transport layer security (TLS). Application server 124 may provide authentication of user devices 170 and secure delivery of credit card information.

Profile server 130 may store user profile information for users (e.g., users of user devices 170). The user profile information may include various information regarding a user, such as login information (e.g., a user identifier and a password), billing information, address information, types of services to which the user has subscribed, a list of content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 135 may manage charging users for services provided via video service provider system 102. Billing server 135 may include, for example, a payment processing component, a billing component, and/or a settlement component. In some implementations, billing services may be performed by servers external to video service provider system 102 (e.g., billing servers for a partner entity).

Entitlement management server 140 may manage entitlements for video content in network 100. For example, entitlement management server 140 may determine an entitlement based on a customer transaction, such as described below, for example with respect to FIGS. 3 and 4. Entitlement management server 140 may also store entitlements and provide a capability for customer care transactions to be implemented based on the entitlements, such as described with respect to FIG. 6 and customer care entitlement management user interface 600. Entitlement management server 140 may further provide customer promotion and retention capabilities, such as described with respect to FIG. 7 and customer entitlement user interface 700.

Physical content distribution system 150 may track availability of physical content (e.g., DVDs, Blu-ray discs, memory cards, etc.) and provide metadata relating to the physical content for inclusion in catalog information provided to users of user devices 170. In one implementation, physical content distribution system 150 may also provide physical content information, such as location information, so that when a user wants to buy physical content, the system may direct the user to the nearest location for purchasing the physical content. Additionally, or alternatively, physical content distribution system 150 may generate or receive credit information for users (e.g., for cross-promotion purposes with a partner entity). For example, after a user of user device 170 has purchased digital content or a subscription/rental of digital content, the user may be entitled to credits for obtaining a corresponding physical asset or vice versa.

Customer support system 160 may solicit and/or receive user feedback, questions, or credit/billing-related requests. Customer support system 160 may interface with entitlement management server 140 to manage entitlements or receive support for customer care transactions from entitlement management server 140. For example, customer support system 160 may implement a customer retention bonus in conjunction with entitlement management server 140.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 135, entitlement management server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a LAN, a WAN, such as a cellular network, a satellite network, a fiber optic network, a private WAN, or a combination of the Internet and a private WAN, etc., that is used to transport data. Although shown as a single element in FIG. 1, public network 190 may include a number of separate networks that function to provide services to user devices 170.

In implementations described herein, entitlements may be determined based on a customer, particular video content, and a time window during which the content may be accessed by the customer. Entitlements may be managed to implement customer care and other operations.

Figure 2:
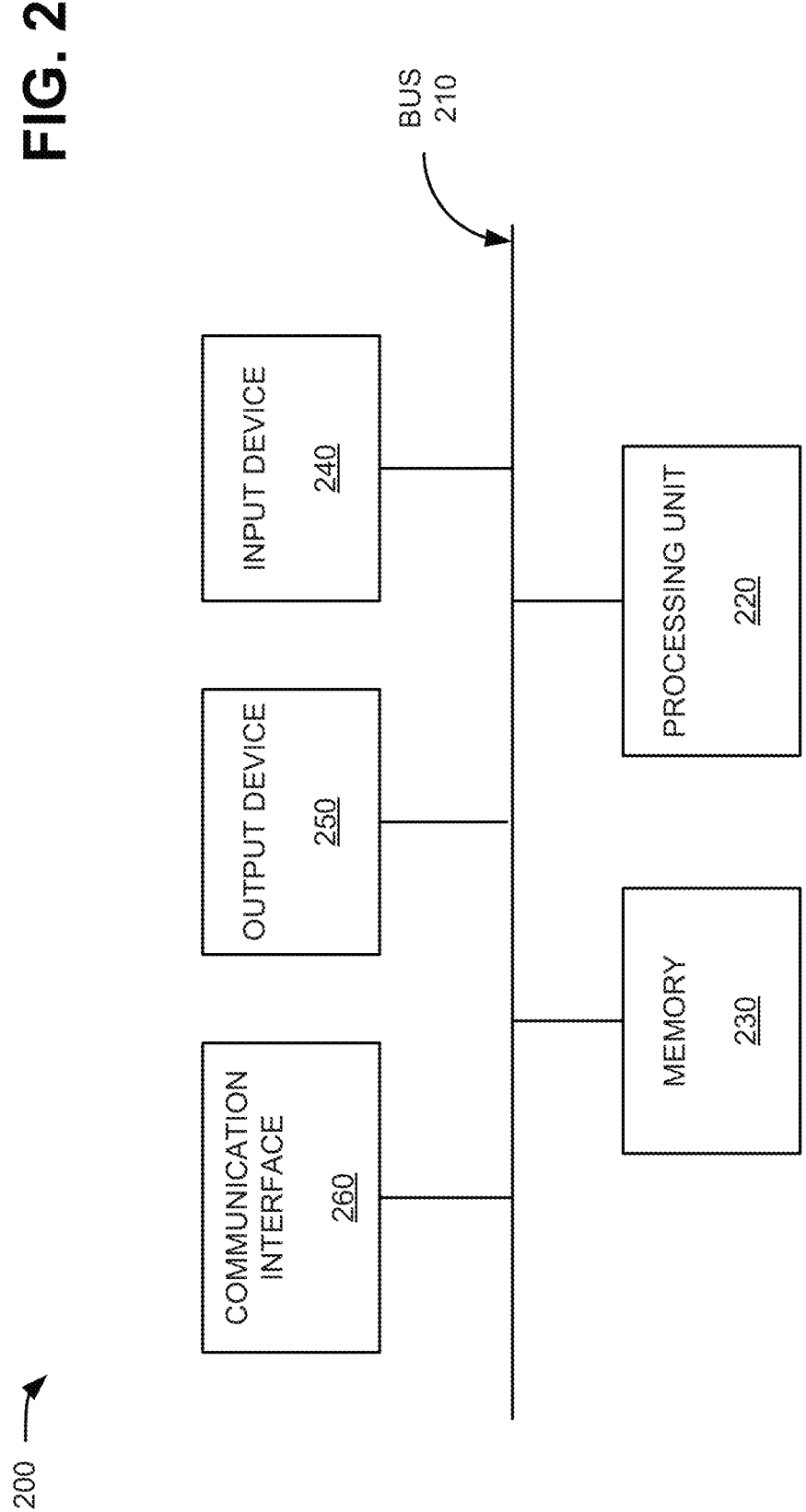
FIG. 2 is a block diagram of exemplary components of a device that may correspond to one of the devices of FIG. 1.

FIG. 2 is a diagram of exemplary components of a device 200. Each of VCMS 110, content delivery server 112, DRM server 114, data center 120, catalog server 122, application server 124, profile server 130, billing server 135, entitlement management server 140, physical content distribution system 150, customer support system 160, or user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
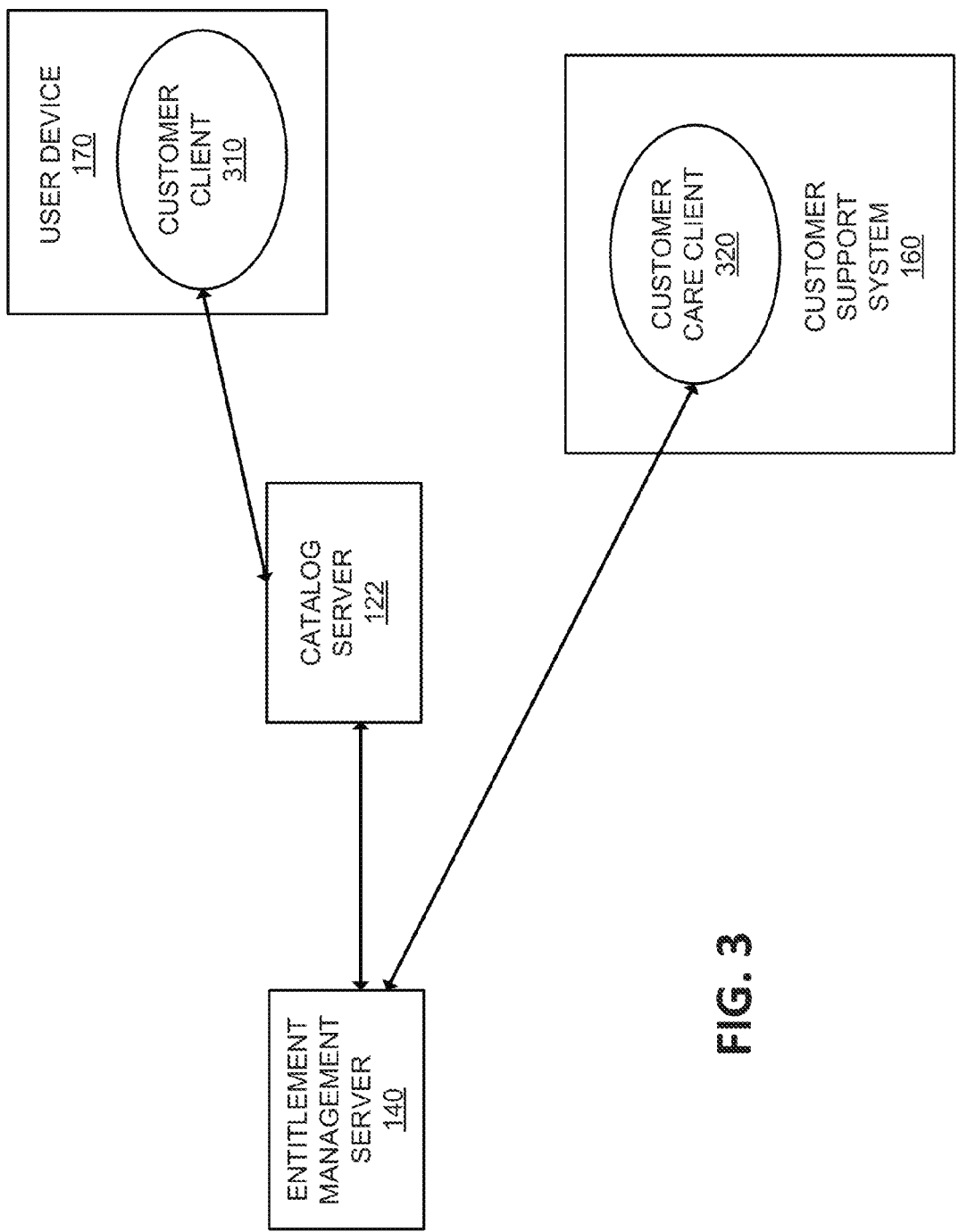
FIG. 3 is a block diagram of a portion of the network of FIG. 1 including entitlement affecting components.

FIG. 3 is a functional block diagram of an entitlement management portion 300 of network 100. Entitlement management portion 300 may include components of different networks that may interface with each other to provide entitlement management for a video service provider entity and, in some instances, a partner entity that may provide physical video content in association with the video service provider entity. As shown in FIG. 3, portion 300 may include catalog server 122, entitlement management server 140, customer support system 160, and user device 170.

As describe briefly above, catalog server 122 may provide access to a catalog of video content via a user interface at user device 170. Catalog server 122 may provide the catalog and user interface in association with, for example, application server 124 (not shown in FIG. 3).

User device 170 may include machine readable instructions, such as a customer client 310, which may enable user device 170 to securely receive/transmit information from/to catalog server 122. A customer may find a movie by browsing, searching, bookmarking, etc.

Customer client 310 may enable user device 170 to communicate with, for example, catalog server 122 or other components of video service provider system 102 and/or present information received from video service provider system 102 to a user. Customer client 310 may allow the customer to complete a transaction to gain access to video content. For example, the customer may purchase video content, subscribe to a channel (or channels), or rent video content.

Entitlement management server 140 may determine entitlements to access video content for particular customers, such as described below with respect to FIG. 4. Entitlement management server 140 may receive requests from catalog server and/or customer support system 160 to identify entitlements or to determine changes to entitlements based on customer care transactions.

Customer support system 160 may include machine readable instructions, such as a customer care client 320, which may enable customer support system 160 to securely receive/transmit information from/to catalog server 122. Customer support system 160 may receive information regarding individual customer accounts from relevant parties or components, such as customers (e.g., email, phone, or other communication), billing server 135, or physical content distribution system 150.

Customer care client 320 may provide a user interface that allows customer support personnel to access information on entitlement management server 140 to perform customer care transactions.

Although not shown in FIG. 3, additional servers may interact with entitlement management server 140 to determine entitlements for access to video content. For example, billing server 135 may receive credit card information associated with user device 170. Entitlements may be altered based on the information received from the additional servers (e.g., entitlements may be suspended or cancelled based on a rejected credit card transaction at billing server 135).

Figure 4:
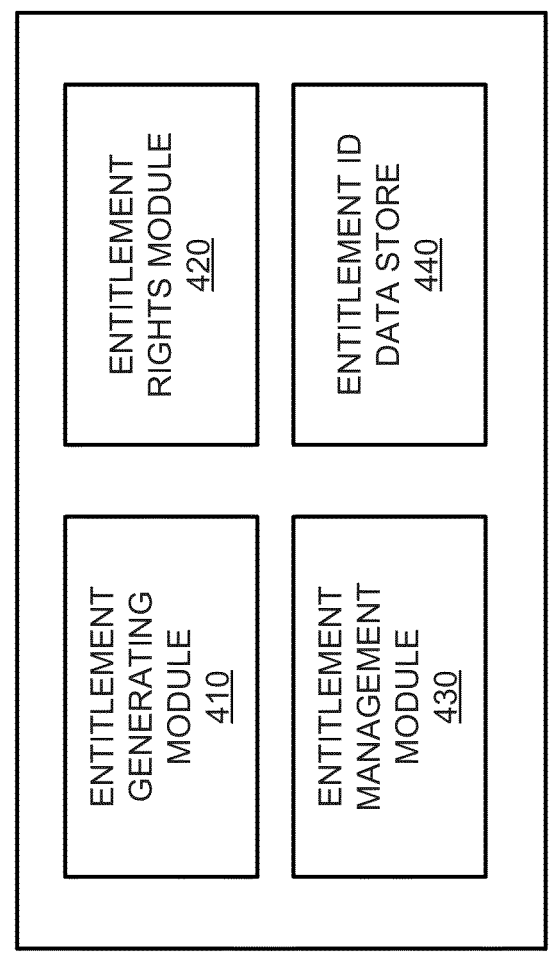
FIG. 4 is a diagram of exemplary functional components of the entitlement management server of FIG. 1.

FIG. 4 is a diagram of exemplary functional components of entitlement management server 140. In one implementation, the functions described in connection with FIG. 4 may be performed by one or more components of device 200 (FIG. 2). As shown in FIG. 4, entitlement management server 140 may include an entitlement generating module 410, an entitlement rights module 420, an entitlement management module 430 and an entitlement ID data store 440. Entitlement management server 140 is described with respect to entitlement identifier (ID) table 500, shown in FIG. 5A, and entitlement rights table 550, shown in FIG. 5B.

Entitlement generating module 410 may generate entitlements to access video content based on a customer transaction. The customer transaction may include a one-time payment (e.g., a purchase of a video content item or items), a series of payments (e.g., a season of a particular TV series), or a continuing series of payments (e.g., a subscription). Entitlement generating module 410 may determine an entitlement ID 502 (shown as entitlement ID 502a and entitlement ID 502b) that may be stored in entitlement ID table 500 associated with the particular customer (or group of customers), such as shown in FIG. 5A. Each entitlement ID 502 may include entitlement subfields, such as a video content ID 510, customer ID 520, and a time window 530. Entitlement IDs 502 may allow the video content provider to determine a particular customer's entitlement to access video content.

Entitlement ID table 500 may include all entitlement IDs 502 that are generated and provide authenticated access to video content in network 100. Video content provider may provide access if an entitlement ID 502 in entitlement ID table 500 is identified that includes a combination of entitlement subfields corresponding to a requested customer, video content item and time window. Entitlement generating module 410 may store entitlement ID table 500 in an associated database or storage device, such as entitlement ID data store 440. Entitlement ID data store 440 may include a searchable indexed store of all entitlement IDs 502 associated with the service provider.

Video content ID 510 may identify particular video content, such as movies, TV shows, and games, which may be provided by the video content provider and may be listed in a catalog provided by catalog server 122. Video content ID 510 may identify (be associated with) a channel, a group of channels, a single video content item (e.g., a movie), or a group of video content items (e.g., a television series, a group of movies, etc.). In some instances, video content ID 510 may identify both a single video content item and a group of video content items to which the single video content item belongs. For example, the video content ID 510 may begin with a sequence of characters that identifies a general movie series and include a sequence of characters that identifies a particular video content item (e.g., a video content ID 510 of bad 412 begins with "bad" that identify a series "Bad Things", and includes "412", which identifies a fourth season and a twelfth episode of the fourth season).

Customers may be identified by a customer ID 520. Customer ID 520 may identify a single customer or a group of customers. In some instances, customer ID 520 may identify both a single customer and a group of customers to which the single customer belongs. For example, the customer ID may begin with a first subsequence of characters that identifies a general group of customers and include a second subsequence of characters that identifies a particular customer (e.g., a customer ID 520 of prem54323477d begins with "prem5" that indicates that the customer belongs to a fifth premium group of customers, and includes "4323477d", which identifies the particular customer.

Time window 530 may identify a period of time during which the customer may access video content. Time window 530 may have a beginning time and an ending time. For example, the time window 530 may begin at 2/17/17 3:04 P.M. and end at 2/19/19 3:04 P.M. Alternatively, in instances in which the customer purchases the video content item or subscribes to a recurring series of video content items (e.g., a subscription to a channel or group of channels), the time window 530 may be open ended (i.e., an open window). For example, the time window 530 may begin at 2/17/17 5:35 P.M. and continue until a time window expiring event is identified (e.g., non-payment of a subscription fee, cancellation of a subscription, etc.).

According to an example, entitlement generating module 410 may receive an indication that a customer, e.g. customer A, has rented video content item (e.g., movie Better Things) for two days. Entitlement generating module 410 may determine a unique entitlement ID 502 with one field an identifier for customer A (e.g., custA123), one field an identifier for the movie Better Things (e.g., moviBet3), and a time window (e.g., a 48 hour time window that begins at a time the movie is rented and ends 48 hours later). Entitlement generating module 410 may determine a unique entitlement ID 502 for each customer and video content item(s) with a corresponding time window 530. Entitlement generating module 410 may determine multiple entitlement IDs for a customer based on different video content items. Entitlement generating module 410 may store the entitlement IDs 502 in entitlement ID table 500.

According to one implementation, a partner entity (e.g., a provider of physical content items via physical content distribution system 150) may provide a customer identifier 520 to entitlement generating module 410 when a customer receives promotional credits for digital content items at initial sign up for the video service in association with the partner entity. Entitlement generating module 410 may generate an entitlement ID 502 that identifies the customer and a source of referral of the customer (e.g., customer ID 520 may include a sequence of characters that identifies the customer and another sequence of characters that identifies the source of referral of the customer), a promotional package of video content items (e.g., the customer may be entitled to access a particular channel), and a time window 530 during which access to the promotion package is valid. Additionally, in some implementations, the partner entity may receive provide an indication that the promotional package is to be cancelled (e.g., if the customer returns the physical content for a refund).

According to an implementation, entitlement rights module 420 may determine and/or identify entitlement rights 550 associated with video content items for each customer. Entitlement rights module 420 may provide an entitlement rights field, an additional field that indicates (includes) entitlement rights 550. Entitlement rights 550 may indicate (or provide a reference) that the particular customer has access for each video content item (or package of video content items) based on a monthly subscription indication 555, purchased indication 560, or rented indication 565. Entitlement rights 550 may indicate whether video content is downloading permitted 570 and/or streaming permitted 575 and an asset quality 580 of video content items (e.g., whether the video content item is high definition (HD), standard definition (SD), etc.).

Entitlement management module 430 may manage entitlements and provide an indication whether a customer is entitled to access particular video content items. For example, a device associated with customer A may request a movie B via catalog server 122. Alternatively, catalog server 122 may request entitlement IDs associated with the customer and present video content items to which the customer is entitled to access as a catalog of entitled video content items (e.g., a customer digital library of entitled video content items). Entitlement management module 430 may check if there is an entitlement ID 502 that includes an identifier for customer A and a video content identifier for movie B stored in entitlement ID table 500. If yes, entitlement management module 430 may check whether a current date and time is within a time window indicated by the entitlement ID 502. If yes, then entitlement management module 430 may provide an indication that customer A is entitled to watch movie B. Catalog server 122 and/or associated servers of network 100, such as content delivery server 112 may provide an opportunity for customer A (i.e., a device associated with customer A) to begin watching movie B.

If entitlement management module 430 determines that an entitlement ID 502 corresponding to customer A, movie B, and a valid time window is not stored in entitlement ID table 500, entitlement management module 430 may provide an indication that customer A is not entitled to access the requested video content item. Catalog server 122 may provide an opportunity for customer A to receive an entitlement to watch movie B (e.g., based on a rental, purchase, subscription, etc.).

According to one implementation, if entitlement management module 430 determines that a valid entitlement ID 502 is not currently stored in entitlement ID table 500, entitlement management module 430 may determine whether customer A has been previously entitled to view movie B (e.g., an entitlement ID 502 matches the customer and movie but has an expired time window). If customer A was previously entitled to access the video content item, entitlement management module 430 may extend time window 530 based on a previous entitlement ID 502. For example, entitlement management module 430 may allow customer A to purchase or rent, at a rate less than a current rate for accessing the video content item, According to another implementation, entitlement management module 430 may extend, suspend, change or terminate an entitlement based on alterations to time window 530. For example, entitlement management module 430 may provide a new end time for time window 530. Entitlement management module 430 may determine changes based on entitlement IDs 502 and corresponding time windows 530 for video content items for each customer or group of customers.

According to one implementation, entitlement management module 430 may manage entitlement IDs 502 that correspond to a subscription. For example, a customer may purchase a subscription, e.g., a collection of movies, with a monthly payment. Entitlement generating module 410 may generate an entitlement ID 502 with a subscription ID (i.e., a video content ID 510), a customer ID 520, and a time window 530. Time window 530 may have an unlimited time. The monthly payment corresponds to an entitlement for all movies in a particular subscription package. The time window is unlimited (open window). If the customer never cancels the subscription and maintains monthly payments, entitlement management module 430 may maintain a same time window 530 (i.e., never update time window 530).

If the customer requests access to watch a subscription movie, entitlement management module 430 may check the subscription ID corresponding to the movie, customer ID 520, and time window 530. If an entitlement ID 502 corresponding to all three required fields (video content ID 510, customer ID 520, and time window 530) is identified in entitlement ID table 500, entitlement management module 430 may allow the customer to access the movie.

Entitlement management module 430 may cancel subscriptions based on time window 530. For example, entitlement management module 430 may cancel a subscription in response to a request for cancellation by a customer. The customer may continue to access subscribed movies until the end of the billing cycle. Entitlement management module 430 may identify an entitlement ID 502 corresponding to the subscription and terminate the subscription. For example, entitlement management module 430 may update the time window 530 to be end of a billing cycle. In another example, entitlement management module 430 may cancel a subscription in response to a failure of recurring payment (e.g., a bad credit card). In this instance, entitlement management module 430 may update an end time for time window 530 with a current date (i.e., subscription cancelled immediately). Similarly, if a free subscription is cancelled, entitlement management module 430 may update an end time of time window 530 with a current time (i.e., the subscription expires immediately).

FIG. 6 illustrates an exemplary entitlement management interface 600. Entitlement management interface 600 may provide an electronic control panel via which customer service personnel associated with a service provider may provide input to manage entitlement IDs 502 associated with customer accounts. Entitlement management interface 600 may include an entitlement management interface icon 602 and entitlement ID control strings 604 (shown in FIG. 6 as entitlement ID control strings 604a-604c). Entitlement management interface 600 may also include a search operation icon 612, a customer promotions icon 614, and a customer retentions icon 616. Entitlement management interface 600 may be accessed via an appropriately authorized and authenticated device associated with personnel for the service provider. In one implementation, instructions input to entitlement management interface 600 may be performed by entitlement management server 140. In another implementation, some or all of the instructions input to entitlement management interface 600 may be performed by another device or group of devices, including or excluding entitlement management server 140.

As shown in FIG. 6, entitlement management interface icon 602 may indicate that a personnel user associated with the service provider for video content services in network 100 (e.g., a customer service user) is currently accessing entitlement management control functionality. The personnel user may provide input that controls entitlement IDs 502 based on entitlement ID control strings 604.

Each entitlement ID control string 604 may provide a capability to enter parameters or ranges of parameters for each field associated with an entitlement ID 502 and to perform operations on ranges of entitlement IDs 502 associated with the indicated ranges of values. The available operations may be indicated by search operation icon 612, a customer promotions icon 614, and a customer retentions icon 616. Each entitlement ID control string 604 may include a customer ID entry field 606 (shown, with respect to entitlement ID control string 604a, as customer ID entry field 606-a), video content entry field 608 (shown as video content entry field 608a-608c, with respect to entitlement ID control strings 604a-604c, respectively) and time window entry field 610 (shown as time window entry fields 610a-610c, with respect to entitlement ID control strings 604a-604c, respectively). The personnel user may enter ranges of combinations of particular customer IDs 520 in customer ID entry field 606, video content IDs 510 in video content entry field 608 and/or time windows 530 in time window entry field 610. The personnel user may then in select an icon (i.e., a function) that indicates an operation to be performed on the entitlement ID control strings 604.

The personnel user may activate (e.g., "click" on) any of the operation icons to provide access to an operation based on the entitlement ID control strings 604. In some instances, the personnel user may be required to provide additional authorization and authentication for transactions that affect a certain number of customers or that involve particular video content. In some instances, entitlement management server 140 may receive information indicating authorization from a third party, such as a business partner (e.g., when the user signs up for a channel on the business partner's website) and an indication of a subscription to a channel or purchase of a video content item.

According to one example, the personnel user may click on search operation icon 612 and enter a search that includes a particular combination of video content IDs 510 and customer IDs 520 in respective video content entry field 608 and customer ID entry field 606 (i.e., an entitlement ID control string 604). Entitlement IDs 502 that include video content IDs 510 may be searched based on a video content ID 510 or partial video content ID 510 input at video content control icon 608. Entitlement IDs 502 that include customer IDs 520 may be searched based on a customer ID 520 or partial customer ID 520 input at customer identifier control icons 606.

The result of the search may include a range of entitlement IDs 502 that include a combination of searched for entitlement subfields.

According to another example, the personnel user may click on customer promotions icon 614 and enter an entitlement ID control string 604 to generate entitlement IDs 502 that provide access for multiple customers for promotional purposes. In other words, the personnel user may request to provide access to bonus video content for a promotional period (entered in time window entry field 610). The personnel user may input an entitlement ID control string 604 that corresponds to video content items 510 and a particular range of customer IDs 520 that are to receive the access to video content for the promotional period. The range of customer IDs 520 may include all customers or a subgroup of customers. For example, entitlement ID control string 604 for a seasonal promotion may include a video content control icon 608 with a first subsequence of characters corresponding to a list of Halloween movies and an identified time window 530 with an end time input by the personnel user at time window control icon 610. The generated entitlement IDs 502 may include a time window 530 based on the promotional period (e.g., time window 530 allows access to video content items 510 until the end of the promotional period). The video content items 510 may be watchable without going through checkout process. In some implementations, entitlement IDs 502 may be provided for particular customers who subscribed for particular packages and have a corresponding subsequence of characters in customer IDs 520. The customers that are to receive access to particular video content may be identified by a predetermined subsequence.

According to another example, the personnel user may click on customer retentions icon 616 and enter an entitlement ID control string 604 to generate entitlement IDs 502 that provide access to entitlements for a customer retention transaction. For example, if a customer wants to cancel the service, customer care may enter entitlement ID control string 604 that provides the customers with particular movies free of charge for a limited time (i.e., a customer retention bonus). Entitlement management module 430 may identify a customer retention video content ID associated with video content to be provided to a retained customer and enter in entitlement ID control string 604. In other words, entitlement management server 140 may create entitlements for the customer within a limited time window.

In some instances, the customer may be provided a reduced retention bonus based on a number of previous customer retention transactions for the retained customer. This retention bonus may be zero after a predetermined number of prior customer retention transactions. The personnel user may also enter input to revoke entitlements for particular customers, for example, customers with frequent refunds. Alternatively, entitlement management server 140 may monitor a number of entitlement IDs 502 associated with customer retention on a per customer basis and provide an indication when the personnel user attempts to provide movies for customer retention after predetermined previous customer retention bonus. Entitlement management module 430 may provide a reduced retention bonus based on a number of customer retention transactions for the retained customer (e.g., a size of a customer retention bonus may be reduced for the first two repeat customer retention transactions and no customer retention bonus may be offered after a third retention bonus is offered to the customer).

Figure 7:
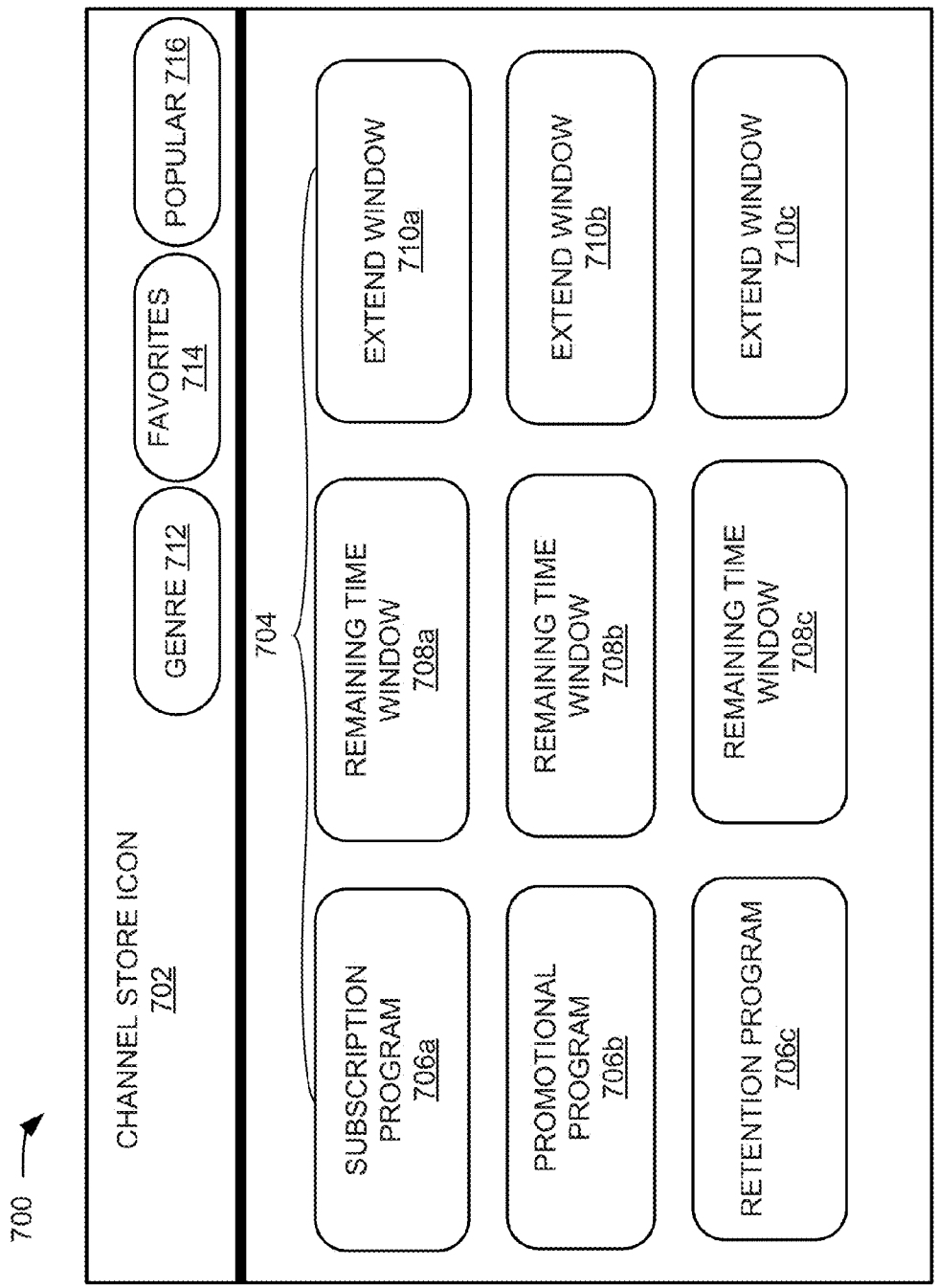
FIG. 7 is a diagram of an exemplary user interface for an entitlement video content interface.

FIG. 7 illustrates an exemplary entitlement video content interface 700. Entitlement video content interface 700 may provide an electronic storefront at which channels or video content may be displayed in groupings based on an associated time window 530. Entitlement video content interface 700 may be accessed via user device 170.

As shown in FIG. 7, entitlement video content interface 700 may include an entitlement video content interface icon 702, and entitlement arranged programs 704 arranged in program groups 706 (e.g., subscription programs 706a, promotional programs 706b, retention programs 706c) and a remaining time window 708a-c. For example, entitlement video content interface 700 may display movies in an order based on a time to an expiry of a time window 530. Movies that are within a predetermined period (e.g., a week) of expiring may be shown in a highlighted group. In another implementation, program groups 706 may be sorted based on similar video content items by clicking on an appropriate icon (e.g., genre 712, favorites 716, popular 716, etc.). The customer may also be provided an opportunity to extend a time window 710a-c for a recently expired video content item (e.g., at a lower cost for a movie that the customer rents again within a week).

According to one implementation, video content items associated with a customer retention bonus (such as described above with respect to FIG. 6) may be separately displayed and/or highlighted. Although icons representing different groups of movies are shown in entitlement video content interface 700, the icons may be arranged in different ways and at different times (e.g., a click through from most currently expiring to subscription content that has an open time window 530).

Figure 8:
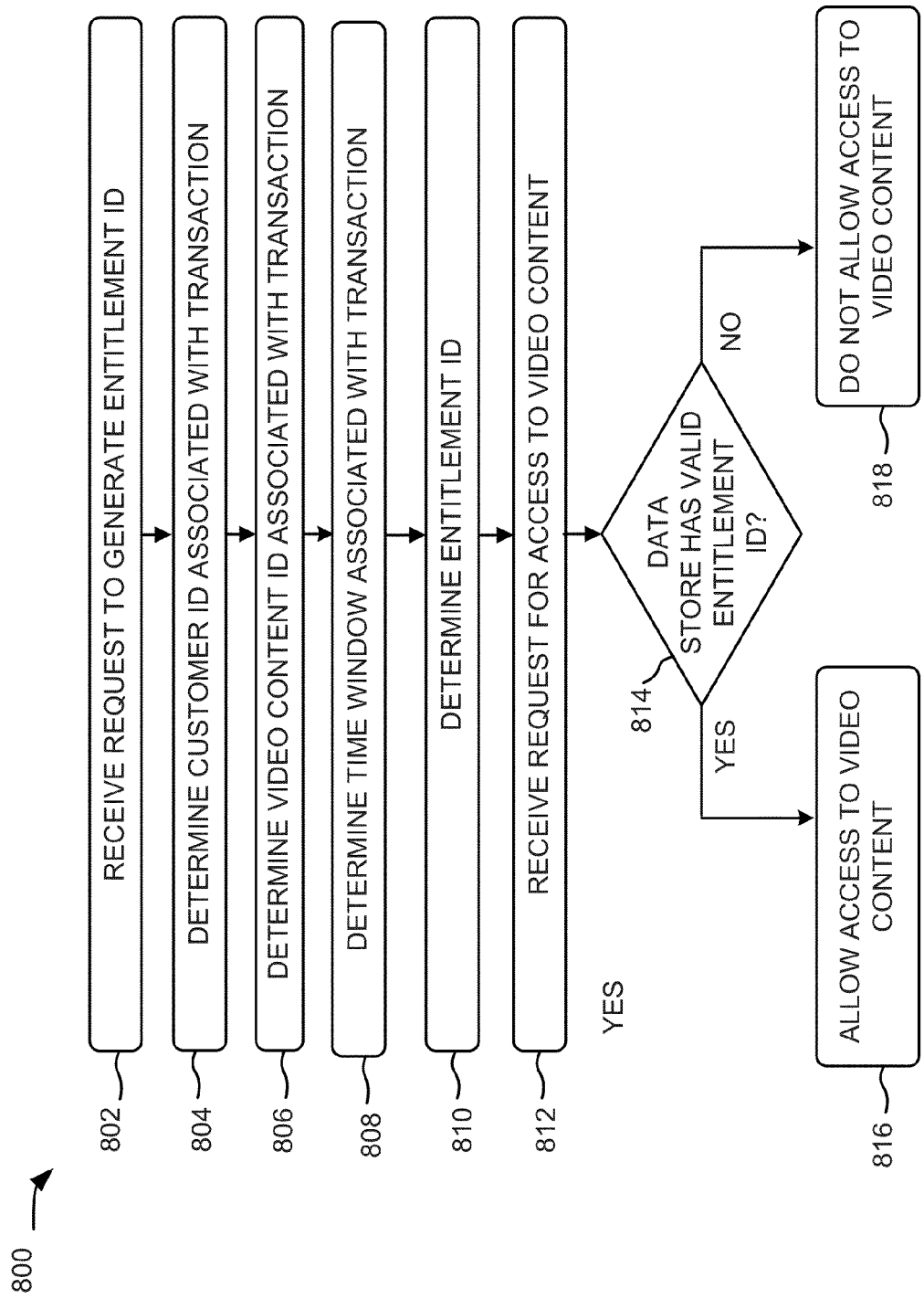
FIG. 8 is a flow chart of an exemplary process for managing entitlements in a network according to an implementation described herein.

FIG. 8 is a flow chart of an exemplary process for implementing entitlement management according to implementations described herein. In one implementation, process 800 may be performed by entitlement management server 140. In another implementation, some or all of process 800 may be performed by another device or group of devices, including or excluding entitlement management server 140.

As shown in FIG. 8, entitlement management server 140 may receive a request to generate an entitlement ID 502 associated with a customer transaction. The customer transaction may include a purchase, a rental or a subscription to video content.

Entitlement management server 140 may determine (or identify) a customer ID (block 804) associated with the customer transaction. For example, entitlement management server 140 may receive customer ID 520 via application server 124.

Entitlement management server 140 may determine (or identify) a video content ID associated with the customer transaction (block 806). For example, entitlement management server 140 may receive video content ID 510 associated with a particular subscription package. In some implementations, entitlement management server 140 may receive multiple video content IDs 510 associated with different video content provided under a same customer transaction (e.g., multiple channels in a movie channel subscription package).

Entitlement management server 140 may determine a time window 530 based on the customer transaction (block 808). For example, entitlement management server 140 may identify a time period associated with a particular customer transaction and determine time window 530 based on a current time and the time period associated with the customer transaction (e.g., an end time for a time window 530 may be 48 hours from a current time for a two day rental).

Entitlement management server 140 may determine an entitlement ID 502 that includes customer ID 520, video content ID 510, and time window 530 (block 810). Entitlement management server 140 may determine an entitlement ID 502 for each video content item covered by a particular customer transaction.

Entitlement management server 140 may receive a request for a video content item (block 812). For example, a customer (i.e., an authenticated user device 170 associated with a particular customer account) may access a digital catalog via catalog server 122 and request a particular movie. The request may include a requested video content ID and a requesting customer ID.

At block 814, entitlement management server 140 may determine whether a valid entitlement ID 502 associated with the customer account and requested video content is in an associated entitlement ID data store 440 (i.e., whether the entitlement ID data store 440 has a valid entitlement ID 502 for the requested content for the customer). For example, entitlement management server 140 may search among entitlement IDs 502 that are indexed by customer ID and/or video content in entitlement ID data store 440. Entitlement management server 140 may also determine whether a time window for the entitlement ID 502 currently allows the customer to view the video content item.

If a valid entitlement ID 502 is located in entitlement ID table 500 (e.g., in entitlement ID data store 440), entitlement management server 140 may provide the customer access to the requested video content item (block 816). For example, entitlement management server 140 may provide a signal for content delivery server 112 to begin transmitting the requested video content item.

If entitlement ID data store 440 does not have a valid entitlement ID 502, entitlement management server 140 may not allow the user to access the video content item (block 818). Alternatively, entitlement management server 140 may allow the customer to purchase access to the requested video content item and thereby receive a valid entitlement ID 502.

Figure 9:
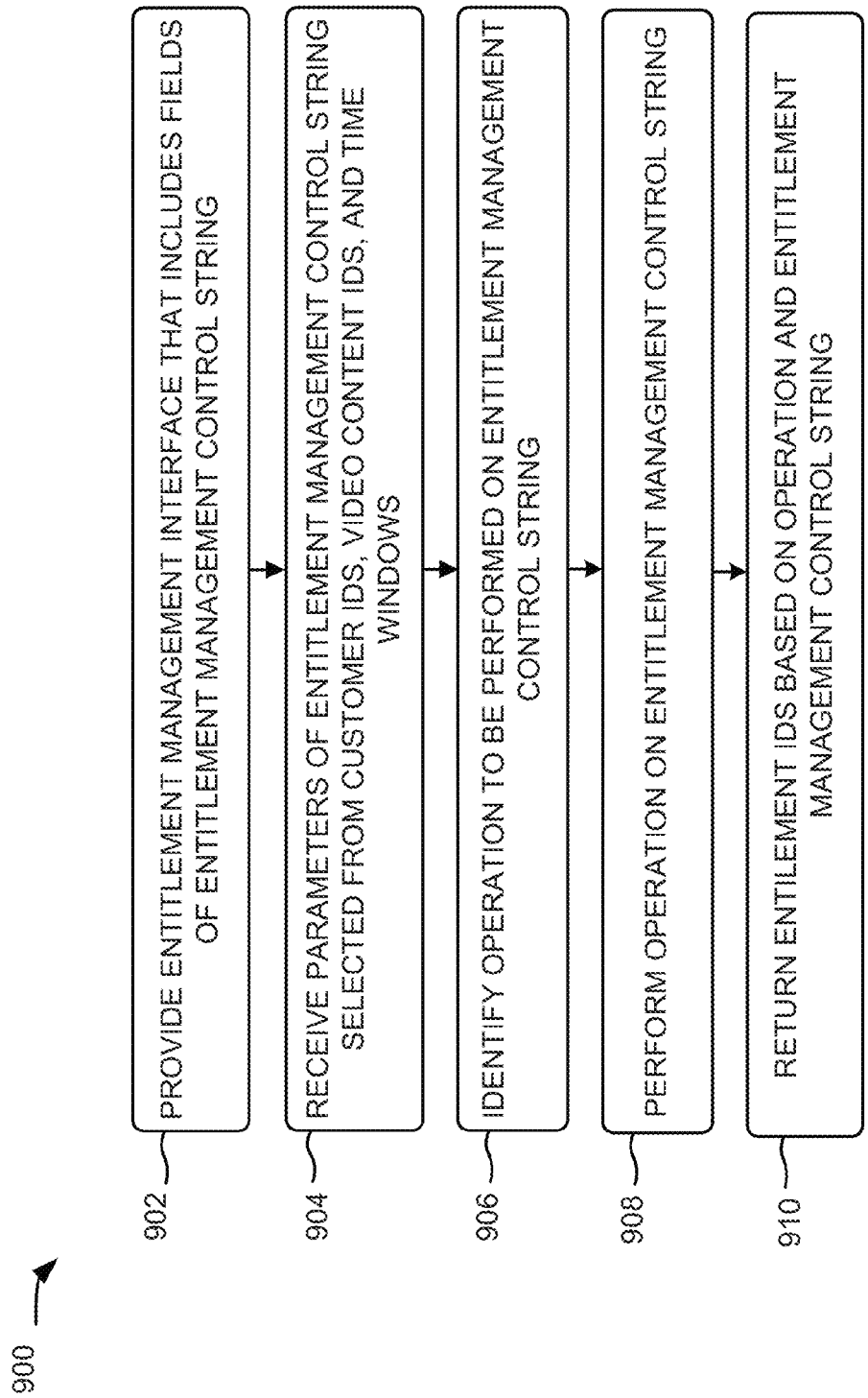
FIG. 9 is a flow chart of another exemplary process for managing entitlements in a network according to an implementation described herein.

FIG. 9 is a flow chart of another exemplary process for implementing entitlement management according to implementations described herein. In one implementation, process 900 may be performed by entitlement management server 140. In another implementation, some or all of process 900 may be performed by another device or group of devices, including or excluding entitlement management server 140.

As shown in FIG. 9, entitlement management server 140 may provide an entitlement management interface (block 902), such as entitlement management interface 600 described above with respect to FIG. 6. The entitlement management interface may include fields at which parameters or ranges of parameters for each field in an entitlement management control string 604 may be entered. These fields may include customer ID entry field 606, video content entry field 608 and time window entry field 610.

At block 904, entitlement management server 140 may receive parameters of entitlement management control string selected from customer IDs, video content IDs, and time windows. For example, the user may enter a customer ID of a customer. The user may also, or alternatively, enter a video content ID and/or a time window. The personnel user may enter characters in the entitlement management control string 604 that indicate one or more of a particular type of parameter (e.g., an asterisk after a subsequence entered in video content entry field 608 may indicate that all video content IDs that begin with the subsequence are to be included in the operation).

Entitlement management server 140 may identify an operation to be performed on entitlement management control string (block 906). For example, entitlement management server 140 may receive an indication that the personnel user has clicked on search operation icon 612, customer promotions icon 614, or customer retentions icon 616.

Entitlement management server 140 may perform the indicated operation on the entitlement management control string 604 (block 908). For example, if the user clicked on the search operation icon 612 (at block 906), entitlement management server 140 may search entitlement ID table 500 based on the parameters entered in the customer ID entry field 606, video content entry field 608 and/or time window entry field 610. Similarly, if the user clicked on the customer promotions icon 614 (at block 906), entitlement management server 140 may generate entitlement IDs 502 based on the entered parameters. In this instance, entitlement management server 140 may have received additional instructions to provide a predetermined maximum time window 530 (e.g., a customer promotion may not last longer than a month).

Entitlement management server 140 may return entitlement IDs 502 based on the indicated operation and the entitlement management control string 604 (block 910). The entitlement IDs 502 may include searched for entitlement IDs 502, or newly generated entitlement IDs for customer promotions or retentions.

Systems and/or methods described herein may allow entitlement management for video content in a network. An entitlement ID may be determined and managed based on a customer ID, a time window and a video content ID.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving, from a user device associated with a customer of a video service provider network, at a server device in the video service provider network, a request to generate an entitlement identifier (ID) associated with a subscription;

determining a customer ID associated with the customer for the subscription;

determining at least one video content ID for at least one video content item associated with the subscription;

determining, by the server device, a time window associated with the subscription;

determining, by the server device, the entitlement ID based on the customer ID, the at least one video content ID, and the time window;

providing the entitlement ID to the user device, wherein the user device is configurable to receive access to the at least one video content item based on presentation of the entitlement ID;

receiving, at the server device, a request for at least one particular video content item from the user device, wherein the request includes a requested video content ID and a requesting customer ID;

determining, based on the time window, whether the entitlement ID is valid, matches the requested video content ID and the requesting customer ID, and is stored in an associated entitlement ID data store in the video service provider network;

sending, from the server device, to at least one content provider device in the video service provider network, a signal to provide access to the at least one particular video content item at the user device, in response to a determination that the entitlement ID is valid, matches the requested video content ID and the requesting customer ID, and is stored in the associated entitlement ID data store;

providing, from the at least one content provider device, access to the at least one particular video content item at the user device based on the signal from the server device;

receiving, from the user device, a request to cancel the subscription associated with the customer ID and a subscription ID;

determining whether the subscription is a free subscription or a paid subscription;

identifying the entitlement ID based on the customer ID and the subscription ID;

entering a current time as an end time for the time window associated with the entitlement ID if the subscription is a free subscription, wherein access to the at least one video content item by the user device is barred after the end time for the time window; and entering an end of a billing period as an end time for the time window associated with the entitlement ID if the subscription is a paid subscription.

2. The computer-implemented method of claim 1, wherein determining whether the entitlement ID is valid, matches the requested video content ID and the requesting customer ID, and is stored in the associated entitlement ID data store further comprises:

determining whether a subsequence of the requested video content ID matches a predetermined subsequence.

3. The computer-implemented method of claim 1, further comprising:

receiving a request to provide access to at least one bonus video content item for a promotional period;

identifying at least one customer ID to receive the access to the at least one bonus video content item for the promotional period;

determining at least one bonus video content ID for the at least one bonus video content item;

determining a second time window based on the promotional period; and determining at least one promotional entitlement ID based on the at least one customer ID, the at least one bonus video content ID, and the second time window.

4. The computer-implemented method of claim 3, wherein the at least one customer ID is associated with one of all customers or a subgroup of customers of a video service provider.

5. The computer-implemented method of claim 1, further comprising:

providing an entitlement management interface, wherein the entitlement management interface includes fields configured to receive parameters of an entitlement management control string, wherein the entitlement management control string provides management of entitlement IDs;

receiving one or more of at least one customer ID, at least one video content ID or a time window in the entitlement management control string;

identifying an operation to be performed on parameters in the entitlement management control string; and providing at least one entitlement ID based on the entitlement management control string and the identified operation.

6. The computer-implemented method of claim 5, wherein the identified operation is one of a search, a customer retention, or a customer promotion.

7. The computer-implemented method of claim 1, further comprising:

receiving a second request to generate a second entitlement ID based on a customer retention transaction associated with the customer, wherein the second request includes a retained customer ID;

identifying a customer retention video content ID associated with video content to be provided to a retained customer;

generating the second entitlement ID based on the retained customer ID and the customer retention video content ID;

determining whether the retained customer has received a previous customer retention bonus; and providing a reduced retention bonus based on a number of customer retention transactions for the retained customer.

8. The computer-implemented method of claim 1, further comprising:

canceling the entitlement ID based on a rejected credit card transaction.

9. A device in a video service provider network, comprising:

a memory to store a plurality of instructions; and a processor configured to execute the instructions in the memory to:

receive, from a user device associated with a customer of the video service provider network, a request to generate an entitlement identifier (ID) associated with a subscription;

determine a customer ID associated with the customer for the subscription;

determine at least one video content ID for at least one video content item associated with the subscription;

determine a time window associated with the subscription;

determine the entitlement ID based on the customer ID, the at least one video content ID, and the time window;

provide the entitlement ID to the user device, wherein the user device is configurable to receive access to the at least one video content item based on the entitlement ID;

receive a request for at least one particular video content item from the user device, wherein the request includes a requested video content ID and a requesting customer ID;

determine, based on the time window, whether the entitlement ID is valid, matches the requested video content ID and the requesting customer ID, and is stored in an associated entitlement ID data store in the video service provider network;

send a signal to provide access to the at least one particular video content item at the user device based on the signal from the server device, in response to a determination that the entitlement ID is valid, matches the requested video content ID and the requesting customer ID, and is stored in the associated entitlement ID data store, wherein at least one content provider device in the video service provider network is to provide access to the at least one particular video content item at the user device based on the signal;

receive, from the user device, a request to cancel the subscription associated with the customer ID and a subscription ID;

identify the entitlement ID based on the customer ID and the subscription ID;

determine whether the subscription is a free subscription or a paid subscription;

enter a current time as an end time for the time window associated with the entitlement ID if the subscription is a free subscription, wherein access to the at least one video content item by the user device is barred after the end time for the time window; and enter an end of a billing period as an end time for the time window associated with the entitlement ID if the subscription is a paid subscription.

10. The device of claim 9, wherein, when determining based on the time window, whether the entitlement ID is valid, matches the requested video content ID and the requesting customer ID, and is stored in the associated entitlement ID data store, the processor is further configured to:

determine whether a subsequence of the requested video content ID matches a predetermined subsequence.

11. The device of claim 9, where the processor is further to:

receive a request to provide access to at least one bonus video content item for a promotional period;

identify at least one customer ID to receive the access to the at least one bonus video content item for the promotional period;

determine at least one bonus video content ID for the at least one bonus video content item;

determine a second time window based on the promotional period; and determine at least one promotional entitlement ID based on the at least one customer IID, the at least one bonus video content ID, and the second time window.

12. The device of claim 9, wherein the processor is further configured to:

receive a request to generate a second entitlement ID based on a customer retention transaction, wherein the request includes a retained customer ID;

identify a customer retention video content ID associated with at least one customer retention video content item to be provided to a retained customer; and generate the second entitlement ID based on the retained customer ID and the customer retention video content ID.

13. A non-transitory computer-readable medium including instructions to be executed by a processor in a device in a video service provider network, the instructions including one or more instructions, when executed by the processor, for causing the processor to:

receive from a user device associated with a customer of the video service provider network, a request to generate an entitlement identifier (ID) associated with a subscription;

determine a customer ID associated with the customer for the subscription;

determine at least one video content ID for at least one video content item associated with the subscription;

determine a time window associated with the subscription;

determine the entitlement ID based on the customer ID, the at least one video content ID, and the time window provide the entitlement ID to the user device, wherein the user device is configurable to receive access to the at least one video content item based on the entitlement ID;

receive, at the device, a request for at least one particular video content item from the user device, wherein the request includes a requested video content ID and a requesting customer ID;

determine, based on the time window, whether the entitlement ID is valid, matches the requested video content ID and the requesting customer ID, and is stored in an associated entitlement ID data store in the video service provider network;

send, to at least one content provider device, a signal to provide access to the at least one particular video content item at the user device, in response to a determination that the entitlement ID is valid, matches the requested video content ID and the requesting customer ID, and is stored in the associated entitlement ID data store;

provide, from the at least one content provider device, access to the at least one particular video content item at the user device based on the signal;

receive, from the user device, a request to cancel the subscription associated with the customer ID and a subscription ID;

determine whether the subscription is a free subscription or a paid subscription;

identify the entitlement ID based on the customer ID and the subscription ID;

enter a current time as an end time for the time window associated with the entitlement ID if the subscription is a free subscription, wherein access to the at least one video content item by the user device is barred after the end time for the time window; and enter an end of a billing period as an end time for the time window associated with the entitlement ID if the subscription is a paid subscription.

14. The non-transitory computer-readable medium of claim 13, wherein, when determining based on the time window, whether the entitlement ID is valid, matches the requested video content ID and the requesting customer ID, and is stored in the associated entitlement ID data store, the one or more instructions further cause the processor to:

determine whether a subsequence of the requested video content ID matches a predetermined subsequence.

15. The non-transitory computer-readable medium of claim 13, wherein the one or more instructions further cause the processor to:

provide an entitlement management interface, wherein the entitlement management interface includes fields configured to receive parameters of an entitlement management control string, wherein the entitlement management control string provides management of entitlement IDs;

receive one or more of at least one customer ID, at least one video content ID or a time window in the entitlement management control string;

identify an operation to be performed on parameters in the entitlement management control string; and provide at least one entitlement ID based on the entitlement management control string and the identified operation.

16. The non-transitory computer-readable medium of claim 13, wherein the one or more instructions further cause the processor to:

receive a second request to provide access to at least one bonus video content item for a promotional period;

identify at least one customer ID to receive the access to the at least one bonus video content item for the promotional period;

determine a bonus video content ID for the at least one bonus video content item;

determine a second time window based on the promotional period; and determine at least one promotional entitlement ID based on the at least one customer ID, the at least one bonus video content ID, and the second time window.

17. The non-transitory computer-readable medium of claim 16, wherein the at least one customer ID is associated with one of all customers or a subgroup of customers of a video service provider.

18. The non-transitory computer-readable medium of claim 13, wherein the one or more instructions further cause the processor to:

cancel the entitlement ID based on a rejected credit card transaction.

19. The non-transitory computer-readable medium of claim 13, wherein the one or more instructions further cause the processor to:

store the entitlement ID in an indexed searchable database associated with an entitlement ID data store.

\* \* \* \* \*